3,053,732
LUNGWORM CONTROL COMPOSITION AND METHOD OF USING SAME

Norman Greenhalgh, Manchester, England, assignor to Imperial Chemical Industries Limited, London, England, a corporation of Great Britain
No Drawing. Filed Jan. 20, 1958, Ser. No. 709,777
Claims priority, application Great Britain Jan. 30, 1957
12 Claims. (Cl. 167—53)

This invention relates to pharmaceutical compositions and more particularly it relates to compositions comprising acid hydrazides suitable for the treatment of lungworm infestations in domestic animals for example in cattle, sheep, pigs and goats.

We have found that lungworm infestations in domestic animals for example in cattle, sheep, pigs and goats can be controlled by the injection into these animals of sterile solutions or suspensions containing at least 0.1% by weight of certain acid hydrazides and/or by the oral administration to those animals of the said acid hydrazides.

According to the invention we provide compositions suitable for administration to domestic animals comprising as active ingredient not less than 0.01% by weight of at least one acid hydrazide of the formula:

$$A.CO.NH.NR_1R_2$$

wherein A stands for the residue of an organic carboxylic acid of the formula A.COOH, wherein $R_1$ stands for a hydrogen atom, wherein $R_2$ stands for a hydrogen atom or for a sulphomethyl radical and wherein $R_1$ and $R_2$ may be combined to form the group $=CXY$ wherein either X stands for a hydrogen atom or for a lower alkyl radical and Y stands for an alkyl, acyl or aryl radical, optionally substituted, or X and Y are joined together to form, together with the adjacent carbon atom, a saturated homocyclic ring, provided that when A stands for a cyanomethyl radical, $R_1$ and $R_2$ are not both hydrogen.

As suitable values of A there may be mentioned for example hydrogen, an ethoxy radical, a carbamyl radical or a straight or branched alkyl radical of not more than seven carbon atoms, optionally substituted by hydroxy, phenoxy, thiol, carbethoxy, carbamyl or cyano radicals. Suitable organic monobasic carboxylic acids containing such residues may be for example formic, acetic, propionic, n- and iso-butyric, n-valeric, n-caproic, γ-methyl-n-valeric, α-ethyl-n-butyric, n-caprylic, glycollic, lactic, α-hydroxyisobutyric, thiolklycollic, phenoxyacetic, carbethoxyacetic, carbamylacetic, ethoxyformic, aminocarbonic and cyanacetic acids; that is to say A may be for example hydrogen or a methyl, ethyl, n-propyl, isopropyl, n-butyl, n-amyl, iso-amyl, α-ethyl-n-propyl, n-heptyl, hydroxymethyl, α-hydroxyethyl, α-hydroxyisopropyl, thiolmethyl, phenoxymethyl, carbethoxymethyl, carbamylmethyl, ethoxy, amino or cyanomethyl radicals respectively.

Further values of A may be the monobasic residues of dibasic carboxylic acids wherein one carboxy group is already substituted for example and particularly those dibasic acids wherein one carboxy group is already substituted by a hydrazide group to give a substituted carboxy group of the formula $R_1R_2N.NH.CO—$ wherein $R_1$ and $R_2$ have the meaning stated above. Thus A may stand for the radical $R_1R_2N.NH.CO.(CH_2)_n$ wherein $R_1$ and $R_2$ have the meaning stated above and $n$ stands for an integer from 0 to 8 inclusive. Thus dibasic aliphatic carboxylic acids which may be substituted in such a manner are oxalic, malonic, succinic, glutaric, adipic, pimelic, suberic, azelaic and sebacic acids.

As suitable values of $R_1$ and $R_2$ being combined to form the group $=CXY$ wherein X stands for a hydrogen atom or for a lower alkyl radical, and wherein Y stands for an alkyl, acyl, or aryl radical, optionally substituted, there may be mentioned for example those values of $=CXY$ wherein X stands for a hydrogen atom and wherein Y stands for a methyl, n-propyl, phenyl, p-chlorophenyl, m-chlorophenyl or o-chlorophenyl radical; that is to say the ethylidene, butylidene, benzylidene, p-chlorobenzylidene, m-chlorobenzylidene and o-chlorobenzylidene radicals respectively. Further values of the group $=CXY$ are those wherein X stands for a methyl radical and wherein Y stands for a methyl, ethyl, n-hexyl or acetyl radical, that is the isopropylidene, sec.-butylidene, α-methylheptylidene and α-acetyl ethylidene radicals respectively. Moreover the group $=CXY$ may stand for the group present in the product of the reaction of an aldose sugar, for example glucose or lactose, with an acid hydrazide of the formula $A.CO.NH.NH_2$ wherein A has the meaning stated above.

As suitable examples of $R_1$ and $R_2$ being combined to form the group $=CXY$ wherein X and Y are joined together to form, together with the adjacent carbon atom, a saturated homocyclic ring there may be mentioned for example the cyclopentylidene and the cyclohexylidene radicals.

Suitable acid hydrazides which may be used as active ingredients in the compositions of the invention include for example the following: formhydrazide, acethydrazide, propionhydrazide, n-butyrhydrazide, isobutyrhydrazide, n-valerhydrazide, γ-methyl n-valerhydrazide, α-ethyl n-butyrhydrazide, n-caproic acid hydrazide, n-caprylhydrazide, glycollic acid hydrazide, lactic acid hydrazide, α-hydroxy-isobutyric acid hydrazide, thioglycollic acid hydrazide, phenoxyacethydrazide, α-carbethoxyacethydrazide, α-carbonylacethydrazide, carbethoxyhydrazine, semioxamazide, oxalhydrazide, malonhydrazide, succinic hydrazide, glutaric hydrazide, adipic hydrazide, pimelic hydrazide, suberic hydrazide, azelaic hydrazide, sebacic acid hydrazide, N'-cyanacetyl-N''-sulphino-methyl hydrazine (as sodium salt), N'-cyanacetyl-N''-ethylidene hydrazine, N'-cyanacetyl-N''-n-butylidene hydrazine, N'-cyanacetyl-N''-isopropylidene hydrazine, N'-cyanacetyl-N''-sec.-butylidene, N'-cyanacetyl-N''-α-methyl, n-heptylidene hydrazine, N'-cyanacetyl-N''-α-acetylethylidene hydrazine, N'-cyanacetyl-N''-cyclohexylidene hydrazine, N'-cyanacetyl-N''-cyclopentylidene hydrazine, N'-cyanacetyl-N''-benzylidene hydrazine, N'-cyanacetyl-N''-p-chlorobenzylidene hydrazine, N'-cyanacetyl-N''-m-chlorobenzylidene hydrazine, N'-cyanacetyl-N''-o-chlorobenzylidene hydrazine, the cyanacethydrazone of lactose, N'-acetyl-N''-isopropylidene hydrazine, N'-acetyl-N''-benzylidene hydrazine, N'-acetyl-N''-α-acetylethylidene hydrazine, N'-acetyl-N''-cyclopentylidene hydrazine, N'-glycollyl-N''-isopropylidene hydrazine, N'-glycollyl-N''-benzylidene hydrazine, N'-propionyl-N''-isopropylidene hydrazine, N'-propionyl-N''-benzylidene hydrazine, N'-propionyl-N''-cyclopentylidene hydrazine, N'-lactyl-N''-benzylidene hydrazine, N'-n-butyryl-N''-isopropylidene hydrazine, N'-n-butyryl-N''-benzylidene hydrazine, N'-α-hydroxyisobutyryl-N''-isopropylidene hydrazine, N'-α-hydroxyisobutyryl-N''-benzylidenehydrazine, N'-n-valeryl-N''-isopropylidene hydrazine, N'-n-valeryl-N''-benzylidene hydrazine, N'-n-valeryl-N''-cyclopentylidene hydrazine, N'-carbethoxy-N''-benzylidene hydrazine, N'-carbethoxy-N''-isopropylidene hydrazine, di-isopropylidene oxalhydrazide, dibenzylidene oxalhydrazide, di-isopropylidene malondihydrazide, dibenzylidene malondihydrazide and the acethydrazone of glucose.

Preferred acid hydrazides which may be used as the active ingredient in the compositions of this invention are glycollic acid hydrazide, n-valeric acid hydrazide, n-caproic acid hydrazide, oxal dihydrazide, isopropylidene cyanacethydrazide, benzylidene cyanacethydrazide, isopropylidene acethydrazide, isopropylidene propionhydrazide and isopropylidene n-butyric hydrazide.

From the preceding description, it is obvious that active ingredients for the present invention may be represented by a formula selected from the group consisting of

NC.CH$_2$.CO.NH.N(H)CH$_2$SO$_3$H

NC.CH$_2$.CO.NH.N=CXY

NC.CH$_2$.CO.NH.N=CZ and

NC.CH$_2$.CO.NH.N=Ald wherein X is selected from the group consisting of hydrogen and alkyl radicals of not more than 4 carbon atoms, Y is selected from the group consisting of alkyl radicals of not more than 6 carbon atoms, acyl radicals of not more than 4 carbon atoms, the phenyl radical and halogenophenyl radicals, Z represents the atoms necessary to complete, together with the adjacent carbon atom, a saturated homocyclic ring of not more than 6 carbon atoms, and Ald represents the aldose sugar group present in the product of the reaction of an aldose sugar with cyanacethydrazide.

Suitable compositions of the invention include pharmaceutical compositions which are sterile aqueous solutions or suspensions or sterile non-aqueous solutions or suspensions of the acid hydrazides of the above formula which can be applied in the treatment of lungworm infestations of domestic animals by injection for example subcutaneously or intramuscularly. Such sterile injectable pharmaceutical compositions comprise preferably between about 1% and about 40% by weight of the said acid hydrazides and may optionally contain other injectable ingredients which are of known veterinary utility when so administered, dissolved or suspended therein. Such ingredients include for example antibacterial agents for example sulphadimidine and stable penicillin preparations. Those compositions of the invention which are suspensions contain their particulate matter in a finely divided form, preferably of a particle size substantially below 100 microns and those compositions which are aqueous suspensions may optionally contain small amounts of such agents as are commonly used to facilitate the manufacture and maintain the efficacy of aqueous suspensions for example they may contain dispersing agents and anti-flocculation agents.

Suitable vehicles for the non-aqueous solutions and suspensions of the invention include for example water-miscible non-toxic vehicles, for example propylene glycol and polyethylene glycol, and water-immiscible non-toxic vehicles, for example injectable vegetable oils for example arachis oil, olive oil and coconut oil.

Sterilisation of the injectable solutions or suspensions of the invention may be brought about by known procedures, for example by aseptic formulation, by Seitz filtration, or again in suitable cases by heat treatment.

The compositions of the invention include pharmaceutical compositions which are sterile powders comprising the said acid hydrazides and optionally containing other injectable ingredients of known veterinary utility when so injected and/or dispersing agents which on mixing with sterile water provide sterile aqueous solutions or suspensions suitable for parenteral administration to domestic animals.

The compositions of the invention also include compositions which are suitable for oral administration to domestic animals comprising preferably not less than 0.1% by weight of the said acid hydrazides and a non-toxic diluent or diluent mixture and optionally containing other compounds which are of known veterinary utility when administered orally for example antibacterial agents for example sulphadimidine and stable penicillin preparations, anthelmintic agents for example phenothiazine, hexachloroethane, piperazine and its salts, antiprotozoal agents for example 6:6'-diquinolylurea dimethosulphate and mineral salt mixes for example mixes containing sodium salts.

The non-toxic diluents or diluent mixtures which can be used in the compositions for oral administration include for example liquid diluents, for example water, solid diluents which may be soluble or insoluble in water for example chalk, kaolin, talc, urea, sodium sulphate, sodium chloride, magnesium sulphate and lactose, other known pharmaceutical excipients and animal feeding stuffs. It is further to be understood that the non-toxic diluents may incorporate small amounts of non-toxic adjuvants such as are commonly used in formulating practice, for example dispersing agents.

The compositions of the invention which are to be applied in the oral treatment of lungworm infestations of domestic animals can exist in a variety of physical forms for example as aqueous solutions or suspensions, as powders and premixes suitable for admixture with animal feeding stuffs, as tablets and capsules and in animal feeding stuffs for example animal feeding stuffs shaped as nuts or pellets. For example there may be mentioned in particular pulverulent compositions of the said acid hydrazides with non-toxic diluents which may be obtained by any means known to the art for example by mixing together and/or grinding together the ingredients of the said compositions in such proportions as to provide the desired compositions. As suitable compositions there may be mentioned for example those containing about 10% by weight of the acid hydrazides and about 90% by weight of chalk, talc, kaolin, lactose, sodium sulphate, sodium chloride, magnesium sulphate or urea. Such pulverulent compositions may conveniently be added either in the dry state or dissolved or suspended in an aqueous medium for example water to a suitable animal feeding stuff or feeding stuff mixture. Alternatively the said compositions may be dissolved or suspended in an aqueous medium for example water or milk and administered to domestic animals in the form of a drench.

Suitable materials which may be used as animal feeding stuffs may be for example those materials known to the art for example feeding meals and concentrates for example crushed oats, barley meal, fish meal, linseed meal, ground nut meal, mixed meals and silage.

The said acid hydrazides are preferably present in the feeding stuff compositions of the invention in a concentration of at least 0.01% by weight.

The acid hydrazide compositions of the invention may be applied directly or indirectly in the treatment of lungworm infestations of domestic animals for example cattle, sheep, pigs and goats.

Thus according to a further feature of the invention we provide a process for the treatment of domestic animals with lungworm infestations which comprises applying to the said animals an effective amount of one of the acid hydrazides with which this invention is concerned.

Certain of the acid hydrazides used as active ingredients in the compositions described above are new compounds.

Thus according to yet a further feature of the invention we provide a group of new compounds which is as follows:

α-ethyl-n-butyric acid hydrazide, α-hydroxy isobutyric acid hydrazide, cyanacethydrazone of lactose, n-butylidene cyanacethydrazide, cyanacethydrazone of methyl-n-hexylketone, cyanacethydrazone of cyclopentanone, o-, m- and p-chlorobenzylidene cyanacethydrazide, isopropylidene glycollic hydrazide, isopropylidene α-hydroxyisobutyric acid hydrazide, benzylidene α-hydroxyisobutyric acid hydrazide, isopropylidene n-valeric acid hydrazide, benzylidene n-valeric acid hydrazide, N'-n-valeryl-N''-cyclopentylidene hydrazine, glucose acethydrazone and N'-benzylidene-N''-carbethoxy hydrazine.

The invention is illustrated but not limited by the following examples in which the parts are by weight:

*Example 1*

One part of acethydrazide is dissolved in 10 parts of water and the solution is sterilised by Seitz filtration. There is obtained a sterile aqueous solution suitable for parenteral administration to animals for the treatment of lungworm infestations.

*Example 2*

One part of glycollic acid hydrazide is dissolved in 10 parts of water and the solution is sterilised by Seitz filtration. There is obtained a sterile aqueous solution suitable for parenteral administration to animals for the treatment of lungworm infestations.

*Example 3*

A mixture of 10 parts of sterile oxal-hydrazide and 90 parts of sterile water is milled aseptically in a sterile ball-mill until the oxalhydrazide particles are substantially below 100 microns in size. The suspension is separated from the balls and filled aseptically into sterile containers. There is obtained a sterile injectable aqueous suspension of oxalhydrazide suitable for parenteral administration to animals for the treatment of lungworm infestations.

*Example 4*

10 parts of isopropylidene propionhydrazide are mixed with 90 parts of chalk in a mechanical mixer and the mixture so obtained is then ground to a fine powder. There is thus obtained a powdered mixture which may be added to food to provide a mixture suitable for oral administration to animals for the treatment of lungworm infestations.

*Example 5*

5 parts of n-caproic acid hydrazide are dissolved in 100 parts of water. The solution is filtered and there is thus obtained a solution suitable for oral administration to animals for the treatment of lungworm infestations.

*Example 6*

One part of formic acid hydrazide is dissolved in 10 parts of water and the solution is sterilised by Seitz filtration. There is obtained a sterile aqueous solution suitable for parenteral administration to animals for the treatment of lungworm infestations.

*Example 7*

One part of propionhydrazide is dissolved in 10 parts of water and the solution is sterilised by Seitz filtration. There is obtained a sterile aqueous solution suitable for parenteral administration to animals for the treatment of lungworm infestations.

*Example 8*

10 parts of n-butyric acid hydrazide and 90 parts of urea are mixed in a mechanical mixer and the mixture so obtained is ground to a fine powder. There is thus obtained a mixture which may be added to water or to food to provide suitable compositions for oral administration to animals for the treatment of lungworm infestations.

*Example 9*

10 parts of isobutyric acid hydrazide and 90 parts of chalk are mixed in a mechanical mixer and the mixture so obtained is ground to a fine powder. There is thus obtained a mixture which may be added to water or to food to provide suitable compositions for oral administration to livestock for the treatment of lungworm infestations.

*Example 10*

10 parts of n-valeric acid hydrazide and 90 parts of kaolin are mixed in a mechanical mixer and the mixture so obtained is ground to a fine powder. There is thus obtained a mixture which may be added to water or to food to provide suitable compositions for oral administration to livestock for the treatment of lungworm infestations.

*Example 11*

10 parts of γ-methyl-n-valeric acid hydrazide and 90 parts of talc are mixed in a mechanical mixer and the mixture so obtained is ground to a fine powder. There is thus obtained a mixture which may be added to water or to food to provide suitable compositions for oral administration to livestock for the treatment of lungworm infestations.

*Example 12*

14 parts of α-ethyl-n-butyric acid hydrazide and 86 parts of tripiperazine dicitrate pentahydrate are mixed in a mechanical mixer and the mixture so obtained is ground to a fine powder. There is thus obtained a powder which may be added to water to give a solution or suspension suitable for oral administration to livestock for the treatment of lungworm infestations.

The α-ethyl-n-butyric acid hydrazide used as starting material may be obtained by heating a mixture of 20 parts of pentane-γ-carboxylic acid ethyl ester, 20 parts of ethyl alcohol and 14 parts of hydrazine hydrate under reflux for 24 hours. Excess hydrazine and alcohol are removed by evaporation and the residue is crystallised from a mixture of ethyl acetate and petroleum ether to give the desired product, M.P. 109–110° C.

*Example 13*

A mixture of 1300 parts of n-caprylic acid hydrazide and 8655 parts of sulphadimidine is milled until the particle size is substantially below 100 microns. It is then transferred to a mechanical mixer where it is agitated while being sprayed with a mixture of 12.5 parts of disodium methylene-bis-naphthalene-2-sulphonate, 10 parts of polyglyceryl ricinoleate and 22.5 parts of water. There is thus obtained a mixture which may be added to water to give a suspension suitable for oral administration to livestock for the treatment of lungworm infestations.

*Example 14*

10 parts lactic acid hydrazide hydrochloride and 90 parts of anhydrous sodium sulphate are mixed in a mechanical mixer and the mixture so obtained is ground to a fine powder. There is thus obtained a mixture which may be added to water or to food to provide a suitable composition for oral administration to livestock for the treatment of lungworm infestations.

*Example 15*

15 parts of α-hydroxyisobutyric acid hydrazide and 3 parts of 1-diethylcarbamyl-4-methylpiperazine dihydrogen citrate are dissolved in 100 parts of water and the solution is Seitz filtered. There is thus obtained a sterile aqueous solution suitable for parenteral administration to animals for the treatment of lungworm infestations.

The α-hydroxyisobutyric acid hydrazide used as starting material may be obtained by allowing a solution of 5.9 parts of methyl α-hydroxyisobutyrate and 4 parts of hydrazine hydrate in 20 parts of methanol to react for 20 hours at 20° C. The reaction mixture is evaporated to dryness in vacuo. The solid residue is crystallised from methanol to give α-hydroxyisobutyrhydrazide, M.P. 100–102° C.

*Example 16*

10 parts of thioglycollic acid hydrazide and 90 parts of urea are mixed in a mechanical mixer and the mixture so obtained is ground to a fine powder. There is thus obtained a mixture which may be added to water or to food for oral administration to livestock for the treatment of lungworm infestations.

Example 17

10 parts of phenoxyacethydrazide and 90 parts of kaolin are mixed in a mechanical mixer and the mixture so obtained is ground to a fine powder. There is thus obtained a mixture which may be added to water or to food for oral administration to livestock for the treatment of lungworm infestations.

Example 18

20 parts of α-carbethoxyacethydrazide, 165 parts of phenothiazine and 10 parts of di-isopropyl naphthalene sodium sulphonate are mixed in a mechanical mixer and the mixture so obtained is ground to a fine powder. There is thus obtained a powder which may be added to water to give an aqueous suspension suitable for oral administration to animals for the treatment of lungworm infestations.

Example 19

10 parts of α-carbethoxyacethydrazide and 90 parts of urea are mixed in a mechanical mixer and the mixture so obtained is ground to a fine powder. There is thus obtained a mixture which may be added to water or to food to provide suitable compositions for oral administration to livestock for the treatment of lungworm infestations.

Example 20

10 parts of α-carbamylacethydrazide and 90 parts of kaolin are mixed in a mechanical mixer and the mixture so obtained is ground to a fine powder. There is thus obtained a mixture which may be added to water or to food to provide suitable compositions for oral administration to livestock for the treatment of lungworm infestations.

Example 21

One part of carbethoxy hydrazine is dissolved in 10 cc. of water and the solution is sterilised by Seitz filtration. There is obtained a sterile aqueous solution suitable for parenteral administration to animals for the treatment of lungworm infestations.

Example 22

10 parts of semioxamazide and 90 parts of kaolin are mixed in a mechanical mixer and the mixture so obtained is ground to a fine powder. There is thus obtained a mixture which may be added to food or to water for oral administration to animals for the treatment of lungworm infestations.

Example 23

10 parts of sodium sulphinomethylcyanacethydrazide and 90 parts or urea are mixed in a mechanical mixer and the mixture is ground to a fine powder. There is thus obtained a mixture which may be added to food or to water for oral administration to animals for the treatment of lungworm infestations.

Example 24

10 parts of oxal dihydrazide and 90 parts of chalk are mixed in a mechanical mixer and the mixture so obtained is ground to a fine powder. There is thus obtained a mixture which may be added to food or to water for oral administration to animals for the treatment of lungworm infestations.

Example 25

A mixture of 10 parts of sterile malondihydrazide and 90 parts of sterile water is milled aseptically in a sterile ball-mill until the malondihydrazide particles are substantially below 100 microns in size. The suspension is separated from the balls and filled aspetically into sterile containers. There is thus obtained a sterile injectable aqueous suspension of malondihydrazide suitable for parenteral administration to animals for the treatment of lungworm infestations.

Example 26

10 parts of succinic dihydrazide and 90 parts of kaolin are mixed in a mechanical mixer and the mixture so obtained is ground to a fine powder. There is thus obtained a mixture which may be added to food or to water for oral administration to animals for the treatment of lungworm infestations.

Example 27

800 parts of tripiperazine dicitrate pentahydrate and 200 parts of glutaric dihydrazide are mixed in a mechanical mixer and the mixture so obtained is ground to a fine powder. There is thus obtained a mixture which may be added to water or to food for oral administration to livestock for the treatment of lungworm infestations.

Example 28

A mixture of 1300 parts of adipic dihydrazide and 8655 parts of sulphadimidine is milled until the particle size is substantially below 100 microns. It is then transferred to a mechanical mixer where it is agitated while being sprayed with a mixture of 12.5 parts of disodium methylene-bis-naphthalene-2-sulphonate, 10 parts of polyglyceryl ricinoleate and 22.5 parts of water. There is thus obtained a dispersible powder which may be added to water to give an aqueous suspension suitable for oral administration to animals for the treatment of lungworm infestations.

Example 29

10 parts of suberdihydrazide and 20 parts of 1-diethylcarbamyl-4-methylpiperazine dihydrogen citrate are mixed in a mechanical mixer and the mixture so obtained is ground to a fine powder. There is thus obtained a mixture which may be added to food or to water to provide compositions suitable for oral administration to animals for the treatment of lungworm infestations.

Example 30

20 parts of azelaic acid dihydrazide, 150 parts of phenothiazine and 10 parts of di-isopropyl naphthalene sodium sulphonate (as dispersing agent) are mixed in a mechanical mixer and the mixture so obtained is ground to a fine powder. There is thus obtained a mixture which may be added to water to give an aqueous suspension suitable for oral administration to animals for the treatment of lungworm infestations.

Example 31

A mixture of 25 parts of sebacic acid dihydrazide, 5 parts of sterile procaine pencillin G and 70 parts of sterile arachis oil is milled aseptically in a sterile ball-mill until the sebacic acid dihydrazide and procaine penicillin G particles are substantially below 100 microns in size. The suspension is separated from the balls and filled aseptically into suitable containers. There is thus obtained a sterile suspension in oil suitable for parenteral administration to animals for the treatment of lungworm infestations.

Example 32

10 parts of cyanacethydrazide and 40 parts of lactose are mixed and dissolved in 80 parts of water and the mixture heated for one hour under reflux. Evaporation of the mixture in vacuo gives a residue of the cyanacethydrazone of lactose which in time slowly solidifies. One part of the above hydrazone is dissolved in 2 parts of water and there is thus obtained a solution which may be added to food or to water for oral administration to animals for the treatment of lungworm infestations. A similar solution of the hydrazone may be obtained by dissolving 1 part of cyanacethydrazide and 4 parts of lactose in 50 cc. of water and allowing the mixture to react for 1 hour at 18–22° C. Again, a similar solution of the hydrazone may be obtained by dissolving 1 part of cyanacethydrazide and 9 parts of lactose in

Example 33

10 parts of ethylidene cyanocethydrazide and 90 parts of chalk are mixed in a mechanical mixer and the mixture so obtained is ground to a fine powder. There is thus obtained a mixture which may be added to food or to water for oral administration to animals for the treatment of lungworm infestations.

Example 34

10 parts of n-butylidene cyanacethydrazide and 90 parts of talc are mixed in a mechanical mixer and the mixture so obtained is ground to a fine powder. There is thus obtained a mixture which may be added to food or to water for oral administration to animals for the treatment of lungworm infestations.

The n-butylidene cyanacethydrazide used as starting material may be obtained by adding 7.2 parts of n-butyraldehyde to a solution of 9.9 parts of cyanacethydrazide in 100 parts of methanol at 30–40° C. and then immediately cooling the reaction mixture to 20° C. After standing for 30 minutes at this temperature the mixture is cooled in ice, and the product collected. Crystallization from a mixture of ethyl acetate and light petroleum ether provides n-butylidene cyanacethydrazide, M.P. 106–107° C.

Example 35

10 parts of isopropylidene cyanacethydrazide and 90 parts of chalk are mixed in a mechanical mixer and the mixture so obtained is ground to a fine powder. 3.13 parts of this mixture are added to 96.87 parts of an animal foodstuff and mixed in a suitable mixer. The animal foodstuff composition so obtained is suitable for oral administration to animals for the treatment of lungworm infestations.

Example 36

20 parts of sec.-butylidene cyanacethydrazide, 80 parts of hexachloroethane and 0.16 part of sodium di-isopropylnaphthalene sulphonate (as dispersing agent) are mixed in a mechanical mixer and the mixture is ground to a fine powder. There is thus obtained a mixture which may be added to water to give a suspension suitable for oral administration to animals for the treatment of lungworm infestations.

Example 37

1 part of the cyanacethydrazone of methyl-n-hexyl ketone, 9 parts of urea and 60 parts of ground oats are mixed in a mechanical mixer and 30 parts of a potato starch are added to form a plastic mass. This mass is granulated and dried at 40° C. and is then compressed into shaped blocks which are then suitable for oral administration to animals for the treatment of lungworm infestations.

The cyanacethydrazone of methyl-n-hexyl ketone used as starting material may be obtained by allowing a mixture of 2.5 parts of cyanacethydrazide, 3.2 parts of methyl-n-hexyl ketone and 70 cc. of methanol to react for 20 hours at 20° C. Evaporation of the reaction mixture in vacuo gives a residue which when crystallised from light petroleum ether provides the cyanacethydrazone of methyl-n-hexyl ketone, M.P. 72–73° C.

Example 38

10 parts of the mono cyanacethydrazone of diacetyl, 30 parts of calcium phosphate and 7.5 parts of maize starch are mixed in a mechanical mixer and sufficient 10% maize starch paste is added to form a granular mass. The mass is dried at 40° C. and the aggregates are broken up by screening. 0.5 part of magnesium stearate is mixed in mechanically and the material so obtained is compressed into tablets each containing one part of the active ingredient. The tablets so obtained may be used in the treatment of lungworm infestations in animals.

Example 39

316 parts of the cyanacethydrazone of cyclohexanone is added to 99,684 parts of animal food and mixed in a convenient mixer. The animal foodstuff composition so obtained is suitable for oral administration to animals for the treatment of lungworm infestations.

Example 40

A mixture of 10 parts of the sterile cyanacethydrazone of cyclopentanone and 90 parts of sterile arachis oil is milled aseptically in a sterile ball-mill until the hydrazone particles are substantially below 100 microns in size. The suspension is separated from the balls and filled aseptically into sterile containers. There is thus obtained a sterile injectable arachis oil suspension of the hydrazone suitable for parenteral administration to animals for the treatment of lungworm infestations.

The cyanacethydrazone of cyclopentanone used as starting material may be obtained by adding 4.5 parts of cyclopentanone to a solution of 5 parts of cyanacethydrazide in 60 parts of ethyl alcohol. The reaction mixture is heated under reflux for 2 hours and is then allowed to cool and the mixture is filtered. The solid residue is crystallised from ethyl alcohol to give the desired product, M.P. 160° C.

Example 41

10 parts of sterile N-benzylidene cyanacethydrazide and 90 parts of sterile water is milled aseptically in a sterile ball-mill until the hydrazide particles are substantially below 100 microns in size. The suspension is separated from the balls and is then filled aseptically into sterile containers. There is thus obtained a sterile injectable aqueous suspension of the hydrazide suitable for parenteral administration to animals for the treatment of lungworm infestations.

Example 42

A mixture of 10 parts of sterile N-benzylidene cyanacethydrazide and 90 parts of sterile arachis oil is milled aseptically in a sterile ball-mill until the hydrazide particles are substantially below 100 microns in size. The suspension is separated from the balls and filled aseptically into sterile containers. There is thus obtained a sterile injectable arachis oil suspension of the hydrazide suitable for parenteral administration to animals for the treatment of lungworm infestations.

Example 43

A mixture of 10 parts of sterile N-p-chlorobenzylidene cyanacethydrazide and 90 parts of sterile olive oil is milled aseptically in a sterile ball-mill until the hydrazide particles are substantially below 100 microns in size. The suspension is separated from the balls and filled aseptically into sterile containers. There is thus obtained a sterile injectable olive oil suspension of the hydrazide suitable for parenteral administration to animals for the treatment of lungworm infestations.

The N-p-chloro-benzylidene cyanacethydrazide, M.P. 200–201° C., used as starting material may be obtained by the process as described at the end of Example 45.

Example 44

A mixture of 10 parts of sterile N-o-chloro-benzylidene cyanacethydrazide and 90 parts of sterile coconut oil is milled aseptically in a sterile ball-mill until the hydrazide particles are substantially below 100 microns in size. The suspension is separated from the balls and is then aseptically filled into sterile containers. There is thus obtained a sterile injectable coconut oil suspension of the hydrazide suitable for parenteral administration to animals for the treatment of lungworm infestations.

The N-o-chloro-benzylidene cyanacethydrazide, M.P.

173–174° C., used as starting material may be obtained by the process as described at the end of Example 45.

*Example 45*

A mixture of 10 parts of sterile N-m-chloro-benzylidene cyanacethydrazide and 90 parts of sterile arachis oil is milled aseptically in a sterile ball-mill until the hydrazide particles are substantially below 100 microns in size. The suspension is separated from the balls and is then filled aseptically into sterile containers. There is thus obtained a sterile injectable arachis oil suspension of the hydrazide suitable for parenteral administration to animals for the treatment of lungworm infestations.

The N-m-chloro-benzylidene cyanacethydrazide used as starting material may be obtained by heating a mixture of 2 parts cyanacethydrazide, 2.8 parts of m-chloro-benzaldehyde and 20 parts of methanol under reflux for 15 minutes. The reaction mixture is cooled, the product collected and crystallised from ethanol to give m-chloro-benzylidene cyanacethydrazide, M.P. 178–179° C.

In a similar manner, using appropriate starting materials, N-p-chloro-benzylidene cyanacethydrazide, M.P. 200–201° C. and N-o-chloro-benzylidene cyanacethydrazide, M.P. 173–174° C., are also obtained.

*Example 46*

5 parts of isopropylidene acethydrazide, 0.6 part of sodium penicillin G and 0.024 part of anhydrous sodium citrate are dissolved in 20 parts of water. The solution is sterilised by Seitz filtration and there is thus obtained a sterile solution suitable for parenteral administration to animals for the treatment of lungworm infestations.

*Example 47*

25 parts of sterile benzylidene acethydrazide, 5 parts of procaine penicillin G, 0.15 part of the sterile product obtained from the condensation of octylcresol with 8–10 molecular proportions of ethylene oxide and 0.15 part of sodium carboxymethylcellulose are mixed aseptically in a mechanical mixer and ground aseptically such that the particles are substantially below 100 microns in size. There is thus obtained a sterile dispersible powder which may be added to water for parenteral administration to animals for the treatment of lungworm infestations.

*Example 48*

10 parts of the monoacethydrazone of diacetyl, 30 parts of calcium phosphate and 7.5 parts of maize starch are mixed in a mechanical mixer and sufficient 10% maize starch paste is added to form a granular mass. The mass is dried at 40° C. and the aggregates are broken up by screening. 0.5 part of magnesium stearate is mixed in mechanically and the material so obtained is compressed into tablets each containing one part of the hydrazone. The tablets so obtained are useful in the treatment of lungworm infestations in animals.

*Example 49*

20 parts of the acethydrazone of cyclopentanone, 165 parts of phenothiazine and 10 parts of di-isopropylnaphthalene sodium sulphonate (as dispersing agent) are mixed in a mechanical mixer and the mixture so obtained is ground to a fine powder. There is thus obtained a mixture which may be added to water to give an aqueous suspension suitable for oral administration to animals for the treatment of lungworm infestations.

*Example 50*

10 parts of isopropylidene glycollic acid hydrazide, and 90 parts of sodium chloride are mixed in a mechanical mixer and the mixture so obtained is ground to a fine powder. There is thus obtained a mixture which may be added to food or to water for oral administration to animals for the treatment of lungworm infestations.

The isopropylidene glycollic acid hydrazide used as starting material may be obtained by heating a mixture of 1.8 parts of glycollic hydrazide and 20 parts of acetone under reflux for one hour. The reaction mixture is cooled and filtered and the solid residue is then crystallised from acetone to give the desired product, M.P. 115–116° C.

*Example 51*

10 parts of benzylidene glycollic acid hydrazide and 90 parts of kaolin are mixed in a mechanical mixer and the mixture so obtained is ground to a fine powder. There is thus obtained a mixture which may be added to food or to water for oral administration to animals for the treatment of lungworm infestations.

*Example 52*

One part of isopropylidene propionhydrazide is dissolved in two parts of water and the mixture is sterilised by heating in an autoclave for one hour at a pressure of 10 lbs. per sq. inch. The sterile solution so obtained is suitable for parenteral administration to animals for the treatment of lungworm infestations.

*Example 53*

10 parts of benzylidene propionhydrazide and 90 parts of chalk are mixed in a mechanical mixer and the mixture so obtained is ground to a fine powder. There is thus obtained a mixture which may be added to food or to water for oral administration to animals for the treatment of lungworm infestations.

*Example 54*

140 parts of the propionhydrazone of cyclopentanone and 860 parts of tripiperazine dicitrate pentahydrate are mixed in a mechanical mixer and the mixture so obtained is ground to a fine powder. There is thus obtained a mixture which may be added to food or to water for oral administration to animals for the treatment of lungworm infestations.

*Example 55*

10 parts of benzylidene lactic acid hydrazide and 90 parts of kaolin are mixed in a mechanical mixer and the mixture so obtained is ground to a fine powder. There is thus obtained a mixture which may be added to food or to water for oral administration to animals for the treatment of lungworm infestations.

*Example 56*

40 parts of sterile isopropylidene butyric acid hydrazide, 2 parts of sterile 6:6'-diquinolylurea dimethosulphate, 0.2 part of sterile product obtained from the condensation product of octyl cresol with 8–10 molecular proportions of ethylene oxide and 0.2 part of sterile sodium carboxymethylcellulose are mixed aseptically in a mechanical mixer and ground aseptically to a fine powder such that the particles are substantially below 100 microns. There is thus obtained a sterile dispersible powder which may be added to water for parenteral administration to animals for the treatment of lungworm infestations.

*Example 57*

10 parts of benzylidene n-butyric acid hydrazide, 60 parts of hexachlorethane, 95 parts of phenothiazine, 0.7 part sodium di-isopropylnaphthalene sulphonate as dispersing agent and 3 parts of hydrated aluminium silicate (as suspending agent) are mixed in a mechanical mixer and the mixture is ground to a fine powder. There is thus obtained a mixture which may be added to water to give a suspension suitable for oral administration to animals for the treatment of lungworm, liver fluke and alimentary helminth infestations.

*Example 58*

10 parts of isopropylidene α-hydroxyisobutyric acid hydrazide and 90 parts of anhydrous magnesium sulphate are mixed in a mechanical mixer and the mixture ground to a fine powder. There is thus obtained a mixture which may be added to food or water for the treatment of lungworm infestation.

The isopropylidene α-hydroxyisobutyric acid hydrazide, used as starting material, may be obtained by heating a mixture of 0.9 part of α-hydroxyisobutyrhydrazide, 3 parts of acetone and 10 parts of ethanol under reflux for 1 hour. The reaction mixture is evaporated to dryness and the residue is crystallised from a mixture of acetone and light petroleum ether to give isopropylidene α-hydroxyisobutyrhydrazide, M.P. 100–101° C.

*Example 59*

10 parts of benzylidene α-hydroxyisobutyric acid hydrazide and 90 parts of chalk are mixed in a mechanical mixer and the mixture so obtained is ground to a fine powder. There is thus obtained a mixture which may be added to food or to water for oral administration to animals for the treatment of lungworm infestations.

The benzylidene α-hydroxyisobutyric acid hydrazide used as starting material may be obtained by heating a mixture of 1.2 parts of α-hydroxyisobutyrhydrazide, 1.5 parts of benzaldehyde and 10 parts of methanol under reflux for 15 minutes. The mixture is cooled and filtered and there is thus obtained benzylidene α-hydroxyisobutyrhydrazide, M.P. 195–196° C.

*Example 60*

10 parts of isopropylidene n-valeric acid hydrazide and 90 parts of talc are mixed in a mechanical mixer and the mixture so obtained is ground to a fine powder. There is thus obtained a mixture which may be added to food or to water for oral administration to animals for the treatment of lungworm infestations.

The isopropylidene n-valeric acid hydrazide used as starting material may be obtained by heating a mixture of 6 parts of n-valeric acid hydrazide and 20 parts of acetone under reflux for 3 hours. The excess acetone is then removed by evaporation and the residue is distilled under reduced pressure. The fraction boiling at 150° C./20 mm. is collected and is then crystallised from petroleum ether (B.P. 40–60° C.) to give the desired product M.P. 36–38° C.

*Example 61*

10 parts of benzylidene n-valeric acid hydrazide and 90 parts of kaolin are mixed in a mechanical mixer and the mixture so obtained is ground to a fine powder. There is thus obtained a mixture which may be added to food or to water for oral administration to animals for the treatment of lungworm infestations.

The benzylidene n-valeric acid hydrazide used as starting material may be obtained by heating a mixture of 6 parts of n-valeric acid hydrazide, 30 parts of ethyl alcohol and 7 parts of benzaldehyde under reflux for 3 hours. Excess alcohol is removed by evaporation and the residue is crystallised from aqueous alcohol to give the desired product, M.P. 86° C.

*Example 62*

A mixture of 1870 parts of sterile benzylidene carbethoxy hydrazine and 8175 parts of sterile sulphadimidine is milled aseptically until the particle size is substantially below 100 microns. It is then transferred aseptically to a sterile mechanical mixer where it is agitated while being sprayed aseptically with a sterile solution of 55 parts of a phenol ethylene oxide condensation product (as dispersing agent) dissolved in 400 parts of 80% ethanol. The powder is then dried aseptically under reduced pressure at a temperature below 50° C. to give a sterile powder. By mixing one part thereof with between 2 and 4 parts of sterile water there is obtained a sterile aqueous suspension suitable for parenteral administration to animals for the treatment of lungworm infestations.

The benzylidene carbethoxy hydrazine used as starting material may be obtained by adding 5.3 parts of benzaldehyde to a solution of 5.2 parts of carbethoxy hydrazine in 10 parts of ethanol and the mixture is shaken vigorously for several minutes. The mixture is then cooled in ice, 50 parts of water are added and the product collected by filtration. The solid residue is crystallized from aqueous ethanol to give benzylidene carbethoxy hydrazine, M.P. 138–140° C.

*Example 63*

10 parts of N'-carbethoxy-N''-isopropylidene hydrazine and 90 parts of urea are mixed in a mechanical mixer and the mixture so obtained is ground to a fine powder. There is thus obtained a mixture which may be added to food or to water for oral administration to animals for the treatment of lungworm infestations.

*Example 64*

10 parts of di-isopropylidene oxal dihydrazide and 90 parts of kaolin are mixed in a mechanical mixer and the mixture so obtained is ground to a fine powder. There is thus obtained a mixture which may be added to food or to water for oral administration to animals for the treatment of lungworm infestations.

*Example 65*

10 parts of di-benzylidene oxal dihydrazide and 90 parts of chalk are mixed in a mechanical mixer and the mixture so obtained is ground to a fine powder. There is thus obtained a mixture which may be added to food or to water for oral administration to animals for the treatment of lungworm infestations.

*Example 66*

A mixture of 10 parts of sterile di-isopropylidene malondihydrazide and 90 parts of sterile water is milled aseptically in a sterile ball-mill until the hydrazide particles are substantially below 100 microns in size. The suspension is separated from the balls and filled aseptically into sterile containers. There is thus obtained a sterile injectable aqueous suspension of the hydrazide suitable for parenteral administration to animals for the treatment of lungworm infestations.

*Example 67*

A mixture of 10 parts of sterile di-benzylidene malondihydrazide and 90 parts of sterile arachis oil is milled aseptically in a sterile ball-mill until the hydrazide particles are substantially below 100 microns in size. The suspension is separated aseptically from the balls and filled aseptically into sterile containers. There is thus obtained a sterile suspension in arachis oil suitable for parenteral administration to animals for the treatment of lungworm infestations.

*Example 68*

3.6 parts of glucose and 1.5 parts of acethydrazide are dissolved in 5 parts of water and the mixture is heated under reflux for 3 hours. Evaporation of the reaction mixture in vacuo gives the glucose acethydrazone monohydrate which slowly solidifies on keeping. One part of the above hydrazone is dissolved in water and there is thus obtained a solution which may be added to food or to water for oral administration to animals for the treatment of lungworm infestations.

*Example 69*

10 parts of cyclopentanone n-valer hydrazone and 90 parts of chalk are mixed in a mechanical mixer and the mixture so obtained is ground to a fine powder. There is thus obtained a mixture which may be added to food or to water for oral administration to animals for the treatment of lungworm infestations.

The active ingredient used as starting material may be obtained by adding 3.5 parts of cyclopentanone to a solution of 4.6 parts of n-valeric acid hydrazide in 20 parts of ethyl alcohol. The mixture is heated under reflux for 2 hours and then excess alcohol is removed by evaporation. The residue is crystallised from petroleum ether (B.P. 40–60° C.) to give the desired product, M.P. 67–68° C.

*Example 70*

Glycollic hydrazide is given subcutaneously in the form of an aqueous solution at the rate of 25 mg./kgm. of body weight on each of three successive days to a kid of live-weight 22 kgms. It is observed that this treatment removes all except 22 worms, *Dictyocaulus filaria,* found in the lungs when the animal was killed ten days later. An untreated control twin had 1,778 worms, *Dictyocaulus filaria,* in its lungs.

*Example 71*

Oxal dihydrazide is given subcutaneously in the form of an aqueous dispersion at the rate of 25 mg./kgm. of body weight on each of three successive days to a kid of live-weight 29 kgms. It is observed that this treatment removes all except 169 worms, *Dictyocaulus filaria,* found in the lungs when the animal was killed ten days later. An untreated control kid had 2,135 worms, *Dictyocaulus filaria,* in its lungs.

*Example 72*

Benzylidene cyanacethydrazide is given subcutaneously in the form of an aqueous dispersion at the rate of 25 mg./kgm. of body weight on each of three successive days to a lamb of live-weight 21 kgms. It is observed that this treatment removes all except 5 worms, *Dictyocaulus filaria,* found in the lungs when the animal was killed seven days later. The control lamb had 347 worms, *Dictyocaulus filaria,* in its lungs.

*Example 73*

Isopropylidene cyanacethydrazide is given subcutaneously in the form of an aqueous dispersion at the rate of 25 mg./kgm. of body weight on each of three successive days to a lamb of live-weight 24 kgm. It is observed that this treatment removes all except 8 worms, *Dictyocaulus filaria,* found in the lungs when the animal is killed seven days later. The cntrol lamb had 347 worms, *Dictyocaulus filaria,* in its lungs.

*Example 74*

Isopropylidene propionhydrazide is given subcutaneously in the form of an aqueous solution at the rate of 25 mg./kgm. of body weight on each of three successive days to a lamb of live-weight 19 kgm. It is observed that this treatment removes all except 47 worms, *Dictyocaulus filaria,* found in the lungs when the animal is killed seven days later. The control lamb had 347 worms, *Dictyocaulus filaria,* in its lungs.

What I claim is:

1. Compositions suitable for administration to domestic animals comprising as active ingredient from 0.01% by weight to about 40% by weight of at least one acid hydrazide having a formula selected from the group consisting of $$NC.CH_2.CO.NH.N(H)CH_2SO_3H$$
$$NC.CH_2.CO.NH.N=CXY$$
$$NC.CH_2.CO.NH.N=CZ, \text{ and}$$
$$NC.CH_2.CO.NH.N=Ald$$

wherein X is selected from the group consisting of hydrogen and alkyl radicals of not more than 4 carbon atoms, Y is selected from the group consisting of alkyl radicals of not more than 6 carbon atoms, acyl radicals of not more than 4 carbon atoms, the phenyl radical and halogenophenyl radicals, Z represents the atoms necessary to complete, together with the adjacent carbon atom, a saturated homocyclic ring of not more than 6 carbon atoms, and Ald represents the aldose sugar group present in the product of the reaction of an aldose sugar with cyanacethydrazide, in admixture with a non-toxic pharmaceutical carrier and a non-toxic dispersing agent.

2. Compositions as claimed in claim 1 which are in the form of sterile powders comprising the acid hydrazide.

3. Compositions as claimed in claim 1 which are in the form of sterile liquids.

4. Compositions as claimed in claim 3 which contain between about 1% and about 40% by weight of acid hydrazide.

5. Compositions as claimed in claim 1 which are in a form suitable for oral administration.

6. Compositions as claimed in claim 5 wherein there is present about 10% by weight of the acid hydrazide and about 90% by weight of a member of the group consisting of chalk, talc, kaolin, lactose, sodium sulphate, sodium chloride, magnesium sulphate and urea.

7. Compositions as claimed in claim 5 which contain not less than 0.1% by weight of the acid hydrazide and a non-toxic diluent.

8. Compositions as claimed in claim 7 wherein the non-toxic diluent is selected from the group consisting of water chalk, kaolin, talc, urea, sodium sulphate, sodium chloride, magnesium sulphate lactose and animal feeding stuffs.

9. A composition suitable for injection into domestic animals said composition comprising a sterile solution of from about 1% to about 40% by weight of at least one acid hydrazide having a formula selected from the group consisting of $$NC.CH_2.CO.NH.N(H)CH_2SO_3H$$
$$NC.CH_2.CO.NH.N=CXY$$
$$NC.CH_2.CO.NH.N=CZ, \text{ and}$$
$$NC.CH_2.CO.NH.N=Ald$$

wherein X is selected from the group consisting of hydrogen and alkyl radicals of not more than 4 carbon atoms, Y is selected from the group consisting of alkyl radicals of not more than 6 carbon atoms, acyl radicals of not more than 4 carbon atoms, the phenyl radical and halogenophenyl radicals, Z represents the atoms necessary to complete, together with the adjacent carbon atom, a saturated homocyclic ring of not more than 6 carbon atoms, and Ald represents the aldose sugar group present in the product of the reaction of an aldose sugar with cyanacethydrazide, in a non-toxic injectable solvent for said hydrazide.

10. The composition of claim 9 wherein said solvent is an injectable, water-immiscible vegetable oil.

11. A composition comprising an animal feed having admixed therein from about 0.01% to about 40% by weight of at least one acid hydrazide having a formula selected from the group consisting of $$NC.CH_2.CO.NH.N(H)CH_2SO_3H$$
$$NC.CH_2.CO.NH.N=CXY$$
$$NC.CH_2.CO.NH.N=CZ, \text{ and}$$
$$NC.CH_2.CO.NH.N=Ald$$

wherein X is selected from the group consisting of hydrogen and alkyl radicals of not more than 4 carbon atoms, Y is selected from the group consisting of alkyl radicals of not more than 6 carbon atoms, acyl radicals of not more than 4 carbon atoms, the phenyl radical and halogenophenyl radicals, Z represents the atoms necessary to complete, together with the adjacent carbon atom, a saturated homocyclic ring of not more than 6 carbon atoms, and Ald represents the aldose sugar group present in the product of the reaction of an aldose sugar with cyanacethydrazide.

12. Process for the treatment of domestic animals with lungworm infestations which comprises applying to the said animals an effective amount of at least one of the acid hydrazides having a formula selected from the group consisting of $$NC.CH_2.CO.NH.N(H)CH_2SO_3H$$
$$NC.CH_2.CO.NH.N=CXY$$
$$NC.CH_2.CO.NH.N=CZ, \text{ and}$$
$$NC.CH_2.CO.NH.N=Ald$$

wherein X is selected from the group consisting of hydrogen and alkyl radicals of not more than 4 carbon atoms, Y is selected from the group consisting of alkyl radicals of not more than 6 carbon atoms, acyl radicals of not more than 4 carbon atoms, the phenyl radical and halogenophenyl radicals, Z represents the atoms necessary to complete, together with the adjacent carbon atom, a saturated homocyclic ring of not more than 6 carbon atoms, and Ald represents the aldose sugar group present in the product of the reaction of an aldose sugar with cyanacethydrazide.

References Cited in the file of this patent

UNITED STATES PATENTS

| | | |
|---|---|---|
| 2,849,369 | Muset | Aug. 26, 1958 |
| 2,899,356 | Greenhalgh | Aug. 11, 1959 |
| 2,909,556 | Heininger | Oct. 20, 1959 |
| 2,913,478 | Chur | Nov. 17, 1959 |
| 2,927,126 | Pursglove | Mar. 1, 1960 |

OTHER REFERENCES

Takata: Chem. Abst., vol. 49, 1955, p. 13083.

Shavel: J. Am. Pharm. Ass'n (Scien. ed.), vol. 42, No. 7, July 1953, pp. 402–407.

Bernstein: Am. Rev. of Tuberculosis, vol. 65, No. 4, April 1952, pp. 357, 360 and 361.